United States Patent [19]

Tanaka

[11] Patent Number: 4,630,226
[45] Date of Patent: Dec. 16, 1986

[54] ULTRA-SONIC DISTANCE SENSOR SYSTEM AND METHOD WITH CORRECTION FEATURE FOR SENSOR VALUE

[75] Inventor: Haruto Tanaka, Yokohama, Japan
[73] Assignee: Nissan Motor Company, Limited, Japan
[21] Appl. No.: 650,705
[22] Filed: Sep. 14, 1984

[30] Foreign Application Priority Data

Sep. 19, 1983 [JP] Japan ................................ 58-172686

[51] Int. Cl.⁴ .................... G01S 9/06; G01S 11/00
[52] U.S. Cl. ................................. 364/561; 73/627; 367/99; 367/127
[58] Field of Search .............. 364/560, 561, 562, 563, 364/571; 367/127, 97, 118, 119, 99; 73/627

[56] References Cited

U.S. PATENT DOCUMENTS

| | | | |
|---|---|---|---|
| 4,049,954 | 9/1977 | Vieira et al. | 364/560 |
| 4,125,835 | 11/1978 | Barry | 367/99 X |
| 4,176,337 | 11/1979 | Aechter et al. | 367/118 X |
| 4,276,622 | 6/1981 | Dammeyer | 367/127 X |
| 4,280,205 | 7/1981 | Dammeyer | 367/127 X |
| 4,297,701 | 10/1981 | Henriques | 364/561 X |
| 4,357,672 | 11/1982 | Howells et al. | 364/561 |
| 4,437,332 | 3/1984 | Pittaro | 73/627 X |
| 4,451,909 | 5/1984 | Kodera et al. | 367/99 |
| 4,455,556 | 6/1984 | Koshio et al. | 364/561 X |
| 4,510,587 | 4/1985 | Schneider | 367/118 |
| 4,542,652 | 9/1985 | Reuter et al. | 73/627 X |
| 4,578,783 | 3/1986 | Iwata et al. | 367/99 |

Primary Examiner—Edward J. Wise
Attorney, Agent, or Firm—Lane and Aitken

[57] ABSTRACT

An ultra-sonic distance sensor system includes means for measuring the elapsed time between transmission of ultra-sonic waves and receipt of the return wave reflected by an object which reflects ultra-sonic waves and the distance to which is to be measured. A correction value is derived on the basis of the rate of change of the signal level of a receiver signal output by an ultra-sonic receiver. On the basis of the derived correction value, the resultant distance value or the measured elapsed time value is corrected to ensure accurate measurement of the distance to the object can be ensured. This allows more precise height control for a vehicle when the distance detector is applied to a height control system of an automotive vehicle.

10 Claims, 16 Drawing Figures

| PEAK VALUE | Δt |
|---|---|
| 0 | 37 |
| 1 | 35 |
| 2 | 33 |
| ⋮ | ⋮ |
| 254 | 1 |
| 255 | 0 |

ULTRA-SONIC DISTANCE SENSOR SYSTEM AND METHOD WITH CORRECTION FEATURE FOR SENSOR VALUE

BACKGROUND OF THE INVENTION

The present invention relates generally to an ultra-sonic distance sensor for measuring the distance to an object capable of reflecting ultra-sonic waves by measuring the elapsed time between transmission of the ultra-sonic wave and receipt of reflected ultra-sonic waves. More specifically, the invention relates to an ultra-sonic distance sensor system which can correct the sensor value with a correction value derived on the basis of reflected signal conditions.

Published Japanese Patent Application (Tokkai) Showa 56-153268, published on Nov. 27, 1981 discloses an ultra-sonic distance sensor which measures distance by means of ultra-sonic waves. The system disclosed allows the sensor to range objects over a much wider angular area. A similar system has been disclosed in Published Japanese Patent Application (Tokkai) Showa 56-153267, published on Nov. 27, 1981, in which an estimated maximum distance can be preset to determine discharge or transmission timing of the ultra-sonic wavepulses or packets.

Published Japanese Patent Application (Tokkai) Showa 57-182544 and Published Japanese Utility Model Application (Jikkai) Showa 55-141085 disclose an ultra-sonic distance sensor applied for detecting road clearance in front of a vehicle. Application of an ultra-sonic distance sensor to a height-control system of an automotive vehicle has also been disclosed in the European Patent First Publication No. 0 091 017, published on Oct. 12, 1983, which corresponds to the co-pending U.S. patent application Ser. No. 476,519 filed Mar. 18, 1983 now U.S. Pat. No. 4,518,169.

Generally, an ultra-sonic distance sensor measures the elapsed time between transmission of an ultra-sonic wave packet and receipt of ultra-sonic waves reflected by the object to be ranged. Receipt of the reflected ultra-sonic waves is recognized when the signal level of the reflected ultra-sonic wave receiver signal rises across a given threshold. Assuming the reflected ultra-sonic wave receiver signal is in the form of a rectangular wave, the higher signal level of which corresponds to the maximum amplitude of the reflected ultra-sonic waves, no deviation between the measured distance and an actual distance would be included in the resultant value. However, in practice, the ultra-sonic wave receiver signal is generally in the form of a sine wave in which the signal level increases and decreases gradually. The rate of change of the signal level depends on the amplitude of the reflected ultra-sonic waves. For instance, when the amplitude of the reflected ultra-sonic waves remains at approximately the same level as that of the transmitted ultra-sonic waves the rising edge of the receiver signal is steep enough to prevent any deviation between the measured distance and the actual distance. On the other hand, when the ultra-sonic wave is partially diffused or absorbed by the surface of the object and thus the amplitude of the reflected ultra-sonic wave is correspondingly reduced, the rising or leading edge of the receiver signal will be rather shallow, so that the deviation between the measured distance and the actual distance may become significant and cannot be disregarded when precise measurement of the distance is necessary.

SUMMARY OF THE INVENTION

Therefore, it is an object of the present invention to provide an ultra-sonic distance sensor which can correct for deviations between measured values and actual distances.

Another object of the invention is to provide a system for correcting the distance measured by the ultra-sonic distance sensor with a correction value derived on the basis of signal conditions of reflected ultra-sonic waves.

In order to accomplish the above-mentioned and other objects, an ultra-sonic distance sensor system according to the present invention includes means for measuring the elapsed time between transmission of ultra-sonic waves and receipt of the return waves reflected by an object which reflects ultra-sonic waves and which is to be ranged. A correction value is derived on the basis of the rate of change of the signal level of a receiver signal output by a reflected ultra-sonic receiver. On the basis of the derived correction value, the resultant distance value or the measured elapsed time data is corrected.

Therefore, according to the present invention, accurate measurement of the distance to the object can be ensured. This allows more precise height control for a vehicle when applied to a height control system for an automotive vehicle.

BRIEF DESCRIPTION OF THE DRAWINGS

The present invention will be understood more fully from the detailed description given below and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
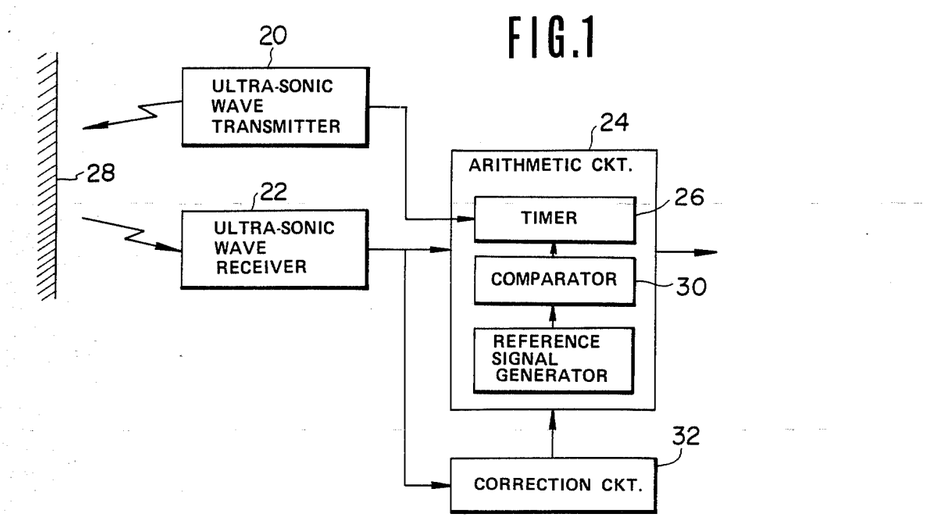
FIG. 1 is a block diagram of the general structure of an ultra-sonic distance sensor according to the present invention.

The general structure of an ultra-sonic distance sensor system according to the present invention is illustrated in FIG. 1. The sensor system generally comprises an ultra-sonic wave transmitter 20, which will be referred to hereafter as "transmitter 20", a reflected ultra-sonic wave receiver 22, which will be referred to hereafter as "receiver 22", and an arithmetic circuit 24 including a timer 26 for measuring the elapsed time T between transmission of ultra-sonic waves and receipt of the ultra-sonic waves reflected by an object 28, the distance to which is to be measured. The arithmetic circuit then calculates the distance to the object on the basis of the timer value.

The transmitter 20 is triggered at regular intervals to transmit or discharge ultra-sonic waves towards the object 28, such as a road surface in cases where the sensor is used to measure ground clearance. The trigger signal which triggers the transmitter 20 is output by a controller such as a vehicle-height controller. The receiver 22 produces a receiver signal having a value which varies according to the amplitude of the received reflected ultra-sonic waves. The arithmetic circuit 24 is also provided with a comparator 30 which compares the receiver signal value with a reference value which is representative of a predetermined threshold. The timer 26 is associated with the transmitter 20 to start measurement of elapsed time in response to transmission of ultra-sonic waves by the transmitter. The timer 26 is, in turn, associated with the comparator 30 to terminate measurement of elapsed time and output a timer signal representative of the measured elapsed time in response to a comparator signal which is output by the comparator when the receiver signal value equals or exceeds the reference value.

A correction circuit 32 is connected to the arithmetic circuit 24 to send a correction signal having a value indicative of a correction value for the timer signal value. The correction circuit 32 is also connected to the receiver 22 to receive the receiver signal. The correction circuit 32 derives the correction value, manner of which will be described later, on the basis of variations in the receiver signal. The arithmetic circuit 24 receives the correction signal and adjusts the timer signal value with the correction value. The arithmetic circuit 24 then derives the distance to the object from the corrected timer signal value and produces a distance-indicative signal. The distance-indicative signal is then sent to the controller of the major vehicle system, such as a vehicle height-control system, as a control parameter.

Figure 2:
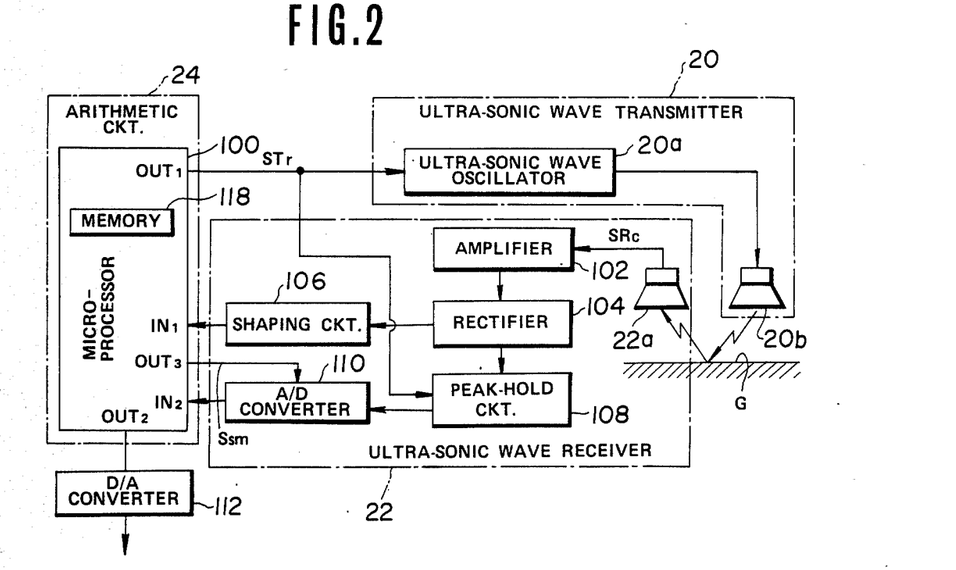
FIG. 2 is a block diagram of the first embodiment of an ultra-sonic distance sensor in accordance with the present invention.

FIG. 2 shows the first embodiment of the ultra-sonic distance sensor system in accordance with the present invention. In this first embodiment, the ultra-sonic sensor system is applied to a vehicle height detection system, which control the ground clearance of the vehicle, and/or a suspension control system.

Means of applying a height detector employing an ultra-sonic distance sensor to a vehicle height control system can be found in the aforementioned European Patent First Publication No. 0 019 017. The disclosure of the European Patent First Publication No. 0 019 017 is hereby incorporated by reference for the sake of disclosure. Means of applying a height detector with an ultra-sonic distance sensor can also be found in the co-pending U.S. patent application Ser. No. 647,648, filed Sept. 6, 1984 for the invention entitled "Automotive Suspension System With Roll-Stabilizer Having Road Condition-Dependent Torsion Modulus, And Control of Torsional Modulus" for which convention priority claims are based on Japanese Patent Application No. 58-166353, filed on Sept. 9, 1983. The disclosure of the aforementioned co-pending U.S. Patent Application is hereby incorporated by reference for the sake of disclosure.

As shown in FIG. 2, the transmitter 20 is connected to the output terminal $OUT_1$ of a microprocessor 100 which also serves as a main controller of the vehicle height detector. The microprocessor 100 is adapted to cyclically or intermittently output a trigger signal STr to the transmitter 20 to activate the latter, which includes a ultra-sonic oscillator 20a and a transmitter section 20b. The oscillator 20a of the transmitter 20 is responsive to the trigger signal to transmit or discharge ultra-sonic waves through the transmitter section 20b towards the road surface G.

The ultra-sonic waves reflected by the road surface G are received by a receiver section 22a of the receiver 22. The receiver section 22a produces a receiver signal SRc having value varying in accordance with the amplitude of the received ultra-sonic waves. The receiver section 22a is connected to an amplifier 102 to supply the receiver signal SRc to the latter. The receiver signal SRc is amplified by the amplifier 102 and sent to a rectifier 104. The rectifier 104 is connected to the input terminal $IN_1$ of the microprocessor 100 through a shaping circuit 106 to input the rectified receiver signal to the microprocessor as a rectangular-pulse signal. The rectifier 104 is also connected to a peak-hold circuit 108 which holds the peak value of the receiver signal. The peak-hold circuit 108 produces a direct-current, peak-value-indicative signal SPe having a value proportional to the held peak value. The peak-hold circuit 108 is connected to the input terminal $IN_2$ of the microprocessor 100 through an analog-to-digital (A/D) converter 110. The A/D converter 110 outputs a binary signal indicative of the peak value-indicative signal value to the microprocessor 100.

The microprocessor 100 is connected to a major external system such as a vehicle height controller (not shown) through a digital-to-analog (D/A) converter 112. In case the major system comprises a digital processor, the output of the microprocessor can be applied as it is. Therefore, in this case, the D/A converter 112 may not be necessary.

The peak-hold circuit 108 is also connected to the output terminal $OUT_1$ of the microprocessor 100 to receive the trigger signal STr. The peak-hold circuit 108 is responsive to the trigger signal STr from the microprocessor 100 to clear the currently held value. The A/D converter 110 is also connected to the output terminal OUT$_3$ of the microprocessor 100. The microprocessor 100 periodically sends a sampling demand SSm to the A/D converter 110. The A/D converter 110 is responsive to the sampling demand SSm to sample the peak-value-indicative signal value from the peak-hold circuit 108.

Figure 3:
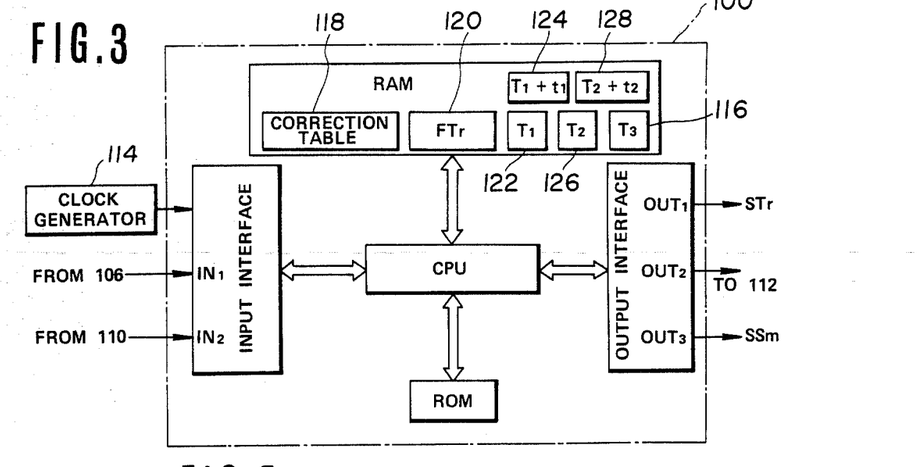
FIG. 3 is a block diagram showing detail of a microprocessor employed in the first embodiment of the ultra-sonic distance sensor of FIG. 2.

As shown in FIG. 3, the microprocessor 100 is also connected to a clock generator 114 which outputs clock pulses at a given frequency. The microprocessor 100 incorporates a clock counter 116 which serves as a timer for measuring elapsed time between the output of the trigger signal and receipt at the input terminal IN$_1$ of a signal from the shaping circuit 106. The clock counter 116 starts counting the clock pulses in response to the trigger signal STr and stops counting in response to an input at the input terminal IN$_1$. The microprocessor 100 also incorporates a memory 118 storing a correction table to be accessed in terms of the peak-value-indicative signal value. The correction table contains a plurality of correction value terms Δt for correcting the timer value, which correction value is dependent upon the peak-value-indicative signal value.

Figure 4:
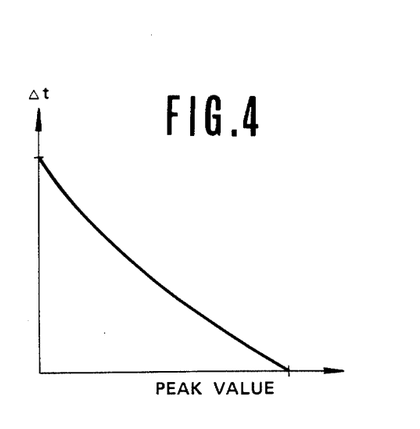
FIG. 4 is a graph of the variation of a correction value in relation to a peak value of a receiver signal produced by the ultra-sonic receiver in FIG. 2.
Figure 5:
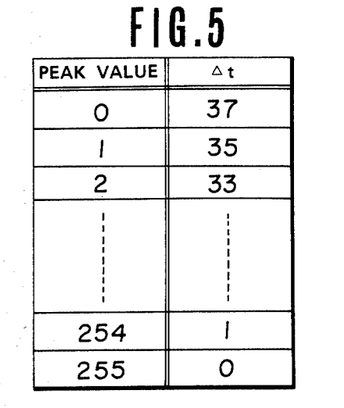
FIG. 5 is a chart of correction values stored in a memory of the microprocessor of FIG. 3.

FIG. 4 shows the variation of the correction value Δt relative to the peak value-indicative signal value. The correction table contains various correction values Δt determined according to the characteristics shown in FIG. 4. FIG. 5 shows various practical correction values derived from numerous experiment. The rate of change of the correction values Δt corresponds to the rate illustrated in FIG. 4.

Figure 6:
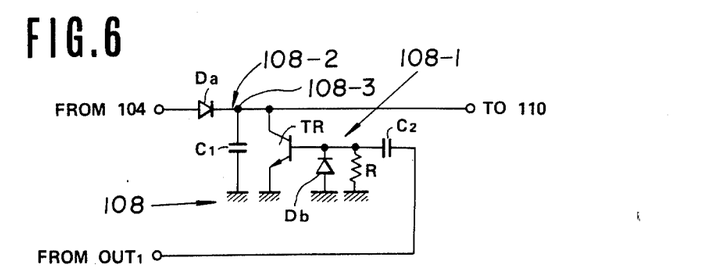
FIG. 6 is a circuit diagram of a peak-holding circuit in the first embodiment of the ultra-sonic distance sensor of FIG. 2.

FIG. 6 shows the detailed circuitry of one example of the peak-hold circuit 108. The peak-hold circuit 108 includes a differentiation circuit 108-1 which comprises a capacitor C$_2$, a resistor R and a diode Db. The differentiation circuit 108-1 is connected to the output terminal OUT$_1$ of the microprocessor 100 to receive the trigger signal STr. The differentiation circuit 108-1 is also connected for output to the base electrode of a transistor TR. The peak-hold circuit 108 also has a charge/discharge circuit 108-2 including a capacitor C$_1$. The collector electrode of the transistor TR is connected to the rectifier 104 through a diode Da and at a junction 108-3 in parallel with the capacitor C$_1$.

The transistor TR temporarily turns ON in response to the trigger signal STr applied to its base electrode through the differentiation circuit 108-1 for a relatively short period of time determined by the time constant of the differentiation circuit. The transistor TR, when conductive, connects the capacitor C$_1$ to ground to discharge the charge the latter. As a result, the potential at the junction 108-3 drops to zero. Thereafter, the transistor TR returns to the non-conductive state. The capacitor is then charged by the input from the rectifier 104. The charge level on the capacitor C$_1$ corresponds to the maximum level of the rectifier output which, in turn, corresponds to the peak value of the amplified receiver signal. The voltage at junction 108-3 corresponding to the charge on capacitor C$_1$ is conducted as the peak value indicative signal to the input terminal IN$_2$ of the microprocessor 100 through the A/D converter 110.

Figure 7:
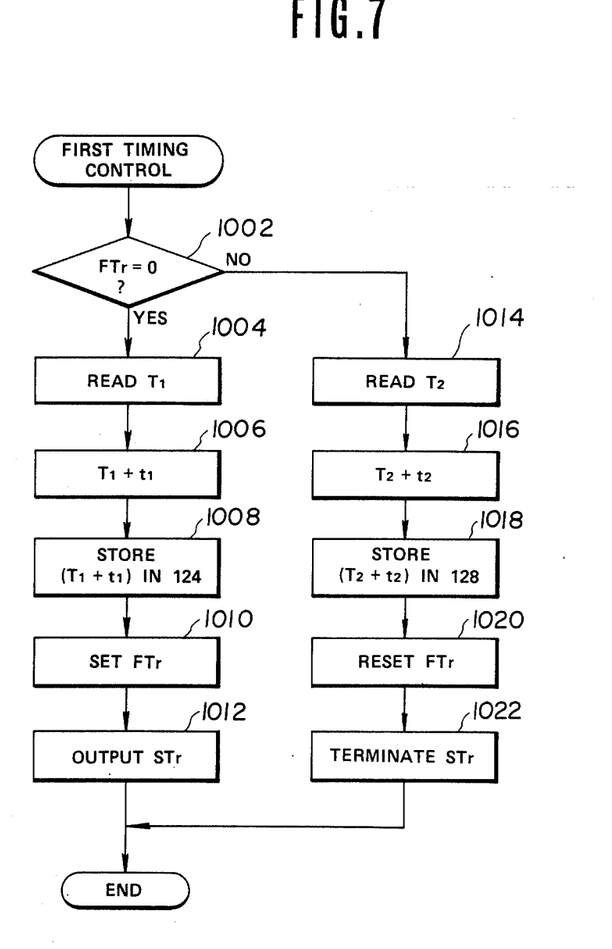
FIG. 7 is a flowchart of a first control program to be executed by the microprocessor of FIG. 3.

FIG. 7 shows a first timing control program executed by the microprocessor 100 to control the output timing of the trigger signal STr.

At the initial stage of execution of the first control program, a trigger signal-output indicative flag FTr in a flag register 120 in the microprocessor is checked at a step 1002. The trigger signal output indicative flag Ftr will be referred to hereafter as "FLAG FTr". The FLAG TRr is set while the trigger signal STr is being output through the output terminal OUT$_1$ of the microprocessor to the transmitter 20 and is reset when the trigger signal is not being output.

If the FLAG FTr is set when checked at a step 1002, then the timer value T$_1$ of a timer 122 in the microcomputer is latched at a step 1004. The timer 122 continuously counts clock pulses from the clock generator 114. A trigger-signal-ON-time indicative time value t$_1$ is added to the latched timer value T$_1$ at a step 1006. The resultant value (T$_1$+t$_1$), which serves as a trigger-signal-OFF-time value, is transferred to and stored in a T$_1$-register 124 in the microprocessor, at a step 1008. Then the FLAG FTr is set at a step 1010. A HIGH level output is applied to the output terminal OUT$_1$ as the trigger signal STr at a step 1012.

During the period t$_1$ starting from the time T$_1$, the potential at the output terminal OUT$_1$ is held HIGH to continue application of the trigger signal STr to the transmitter 20. The time 122 continues counting the clock pulses and produces a T$_1$-signal after period t$_1$ which serves as a trigger signal for the first control program.

In response to the T$_1$-timer signal marking the end of period t$_1$, the first control program is executed again. Since, the FLAG FTr was set at the step 1010 in the previous cycle of program execution, the answer at the step 1002 becomes NO. Then, process goes to a step 1014 to latch a timer value T$_2$ of a second timer 126 in the microprocessor 100 at a step 1016. Similarly to the first-mentioned timer 122, the timer 126 is adapted to continuously count clock pulses from the clock generator 114. An interval-indicative time data t$_2$ is added to the latched timer value T$_2$ at a step 1018. The time data t$_2$ has a value corresponding to the predetermined interval between trigger signals. The resultant time value (T$_2$+t$_2$) is stored in a T$_2$-register 128 in the microprocessor 100. Then, the FLAG FTr is reset at a step 1020. After the step 1020, the output level at the output terminal OUT$_1$ of the microprocessor drops to LOW, at a step 1022. Thus, the trigger signal STr stops.

Figure 8:
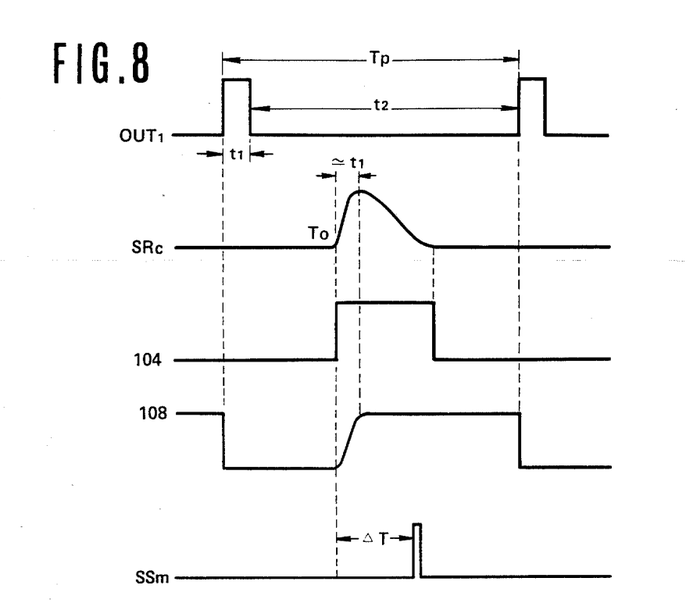
FIG. 8 is a timing chart of an A/D converter serving as a gating circuit, also showing receiver signal variation and variation of the peak-hold value.

As will be appreciated from the above, the trigger signal STr is produced at predetermined intervals t$_2$. The duration of each trigger signal STr is defined by the time value t$_1$, as shown in FIG. 8.

It should be noted that the timer values T$_1$ and T$_2$ may be real time value or counter values of the clock pulses which may be cleared at regular intervals. For example, it would be possible to clear the timer values T$_1$ and/or T$_2$ in an additional step provided between the steps 1002 and 1004. In this case, the timer value T$_1$ read at the step 1004 will always be zero. This would reduce the number of digits required of the timers in the microprocessor. Furthermore, when real-time values are used, the timers 122 and 126 may be connected to a vehicle clock displaying real time instead of being connected connecting to the clock pulse generator.

Figure 9:
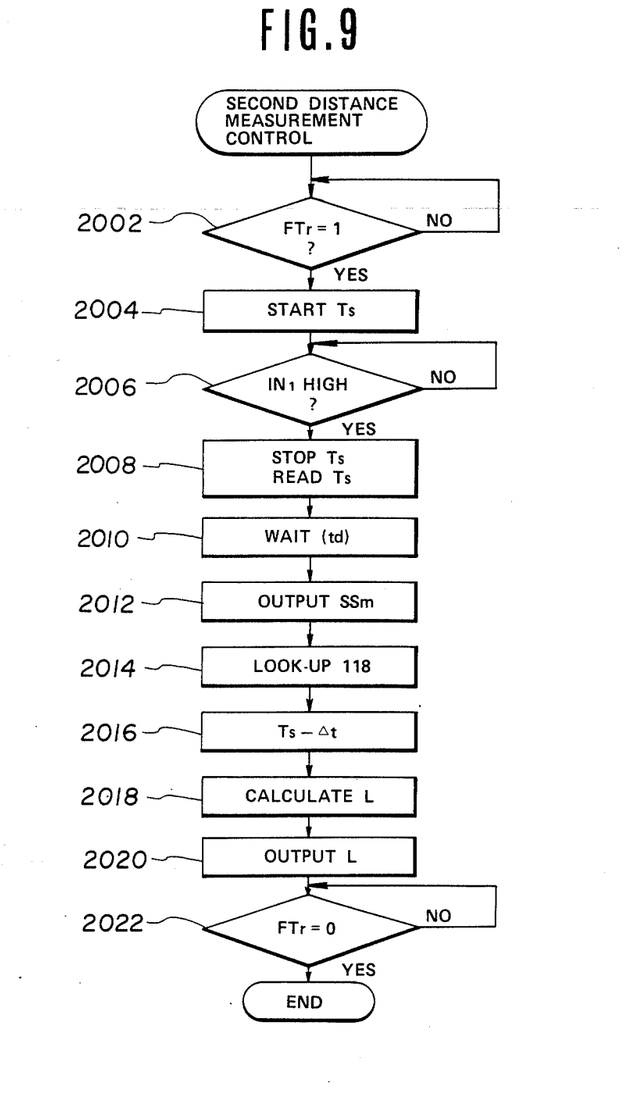
FIG. 9 is a flowchart of a second control program to be executed by the microprocessor of FIG. 3.

FIG. 9 shows a second distance measurement control program which includes steps for correction of the timer value. This second program is to be executed at regular intervals in a fixed relationship relative to the trigger signal output timing determined by the foregoing first control program. At the initial stage of program execution in the second program, the FLAG FTr is checked at a step 2002 to see if it is set. If reset, the step 2002 loops until the FLAG FTr is detected to be set. After the FLAG FTr has been confirmed as being set at the step 2002, the clock counter 116 is activated to start measurement of the interval between transmission of the ultra-sonic waves and receipt of the reflected ultrasonic waves, at a step 2004. Thereafter, at a step 2006, the input level at the input terminal $IN_1$ is monitored until it goes HIGH. That is, the step 2006 loops until a HIGH-level signal is detected at the input terminal $IN_1$. As soon as the HIGH-level input is detected at the step 2006, the counter value $T_S$ of the clock counter 116 is latched and the clock counter 116 is deactivated at a step 2008. At a step 2010, the microprocessor is held in a "WAIT" state for a predetermined delay period $t_d$. This delay period $t_d$ is necessary to allow the peak-hold circuit to record the peak value of the receiver signal. Therefore, the delay time $t_d$ is set to the longest possible period necessary for the peak-hold circuit to record the peak value. In practice, since the receiver signal level reaches its peak within a period approximately corresponding to the duration of the trigger signal $t_1$, as shown in FIG. 8 the delay time $t_d$ is set to be slightly longer than the duration of the trigger signal. Thereafter, as seen in FIG. 8, the sampling demand signal SSm is input to the A/D converter after the peak-hold circuit records the peak value of the receiver signal.

After expiration of the delay time $t_d$, the sample demand SSm is output to the A/D converter 110 through the output terminal $OUT_3$ of the microprocessor, at a step 2012 and the peak value received via the input terminal $IN_2$ in response to the sample demand SSm is read. The correction table in the memory 118 is then accessed in terms of the read peak value at a step 2014, to obtain a correction value t. The obtained correction value is subtracted from the latched value Ts at a step 2016. The corrected value $(T_s - \Delta t)$ is then processed to derive a distance value L at a step 2018. The derived value L is transferred to an output unit (not shown) and then output to the major external system through the D/A converter to a step 2020. Thereafter, the FLAG FTr is again checked at a step 2022. The step 2022 loops until the FLAG FTr is confirmed as being reset. After the FLAG FTr is reset, the current cycle of program execution ends.

Figure 10:
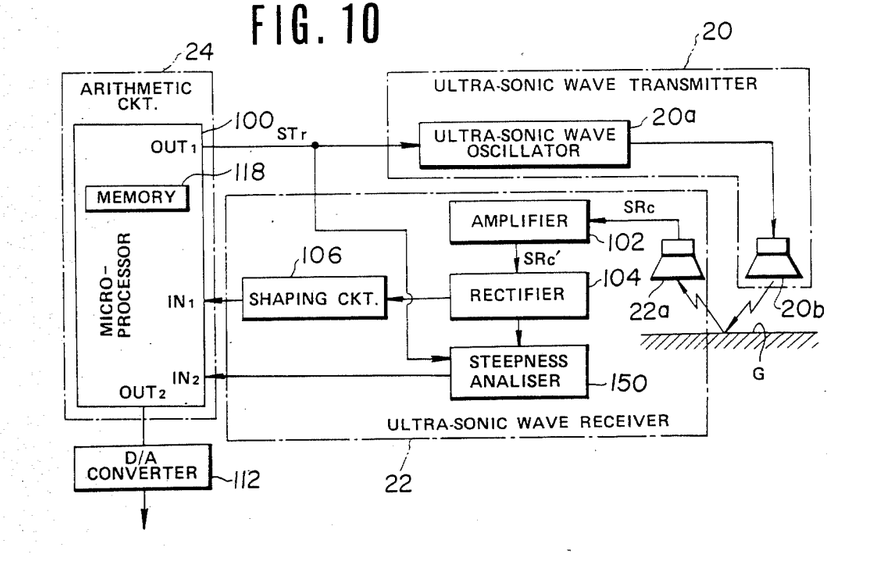
FIG. 10 is a block diagram similar to FIG. 2 but showing the second embodiment of the ultra-sonic distance sensor according to the present invention.

FIG. 10 shows the second embodiment of the ultra-sonic distance sensor according to the present invention. In this embodiment, the peak-hold circuit 108 in the foregoing first embodiment is replaced with a steepness analyser 150. The steepness analyser 150 in the second embodiment is adapted to detect rising characteristics of the receiver signal. The microprocessor 100 is adapted to derive the correction value on the basis of the rising characteristics detected.

Figure 11:
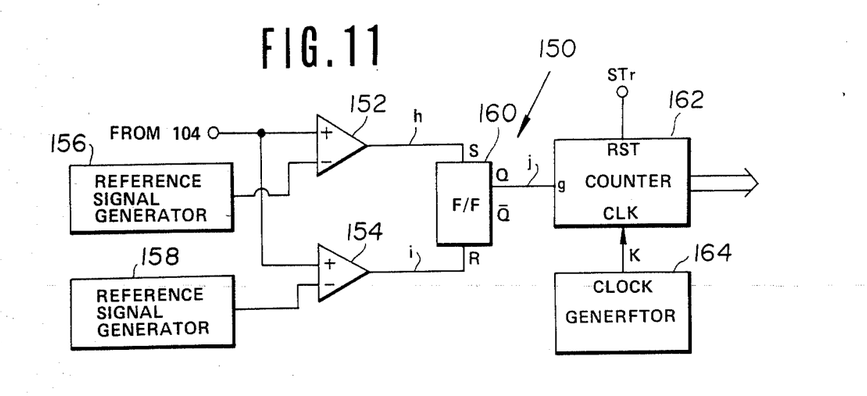
FIG. 11 is a block diagram showing the details of a steepness analyser employed in the distance sensor of FIG. 10.
Figure 14:
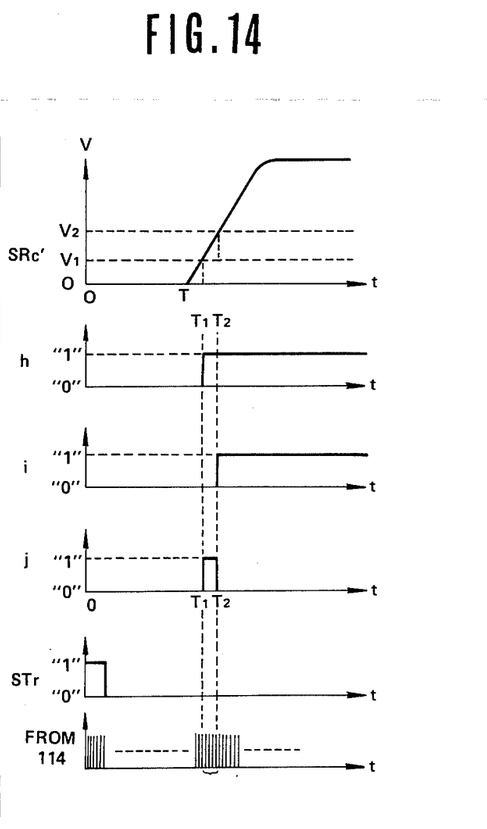
FIG. 14 is a timing chart of the steepness analyser of FIG. 11.
Figure 15:
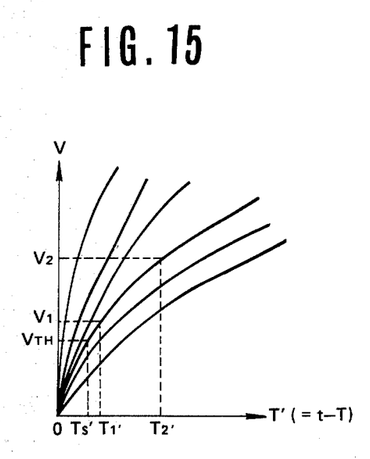
FIG. 15 is a graph of the elapsed time versus receiver signal level.

FIG. 11 shows the details of the steepness analyser 150 employed in the second embodiment of ultra-sonic distance sensor. A pair of comparators 152 and 154 comprise part of the steepness analyser 150. Positive-input terminals of the comparators 152 and 154 are connected to the rectifier 104 to receive the rectified receiver signal. Negative-input terminals of the comparators 152 and 154 are connected to reference signal generators 156 and 158 respectively. The reference signal generator 156 produces a first reference signal $SV_1$ having a constant value $V_1$ representative of a first threshold value. Similarly, the reference signal generator 158 produces a second reference signal $SV_2$ having a constant value $V_2$ representative of the second threshold value. The comparator 152 is connected to the set input terminal of a flip-flop 160. The comparator 154 is connected to the reset input terminal of the flip-flop 160. Therefore, the flip-flop 160 is set by the HIGH-level output from the comparator 152 and reset by the HIGH-level output from the comparator 154, as shown in FIG. 14. As can be seen in FIG. 14, the reference value $V_1$ is smaller than the reference value $V_2$. Therefore, the flip-flop 160 is held in the set state while the rectified receiver signal value remains between the first and second reference values $V_1$ and $V_2$.

The output terminal Q of the flip-flop 160 is connected to a gating input g of a counter 162 which is connected to a clock generator 164 to count clock pulses. The counter 162 is also connected to the output terminal $OUT_1$ of the microprocessor 100 and is cleared by the trigger signal STr output through the output terminal $OUT_1$.

The counter 162 is thus adapted to count clock pulses from the clock generator during the period of time during which a HIGH-level input is applied to the gating input terminal g. The counter 162 outputs a counter signal SCu having a value indicative of the counter value N which represents the time require for the amplified receiver signal to rise from $V_1$ to $V_2$.

Here, assuming the receiver signal rises linearly, the rate of change of the rectified receiver signal level can be represented by:

$$V = (v_2 - V_1/T_2 - T_1) \times (t - T) \qquad (1)$$

This equation can be expressed in terms of to t as:

$$t = T + (T_2 - T_1/V_2 - V_1) \times V \qquad (2)$$

Given that the threshold level at which the presence of reflected ultra-sonic waves are recognized is $V_{TH}$ and the time at which receipt of a reflected ultra-sonic wave pulse is recognized is labelled $T_s$, $T_s$ can be obtained from:

$$T_s = T + (T_2 - T_1/V_2 - V_1) \times V_{TH} \qquad (3)$$

By modifying this equation, $$T = T_s - (V_{TH}/V_2 - V_1) \times (T_2 - T_1) \qquad (4)$$

Assuming $V_{TH}$, $T_1$ and $V_2$ are constant, the above equation (4) can be rewritten as:

$$T = T_s - \alpha \times (T_2 - T_1) \qquad (5)$$

where $\alpha$ is constant.
The above-mentioned equation (5) can be simplified by selecting the output frequency of the clock generator so that the counter value N corresponds to $(T_2 - T_1)$, as:

$$T = T_s - N \qquad (6)$$

As will be appreciated herefrom, when the output frequency of the clock generator is selected to allow direct measurement of $(T_2 - T_1)$ by counting the clock pulses from the clock generator, the counter value N can be used as a parameter representing the rising characteristics of the receiver signal.

Figure 12:
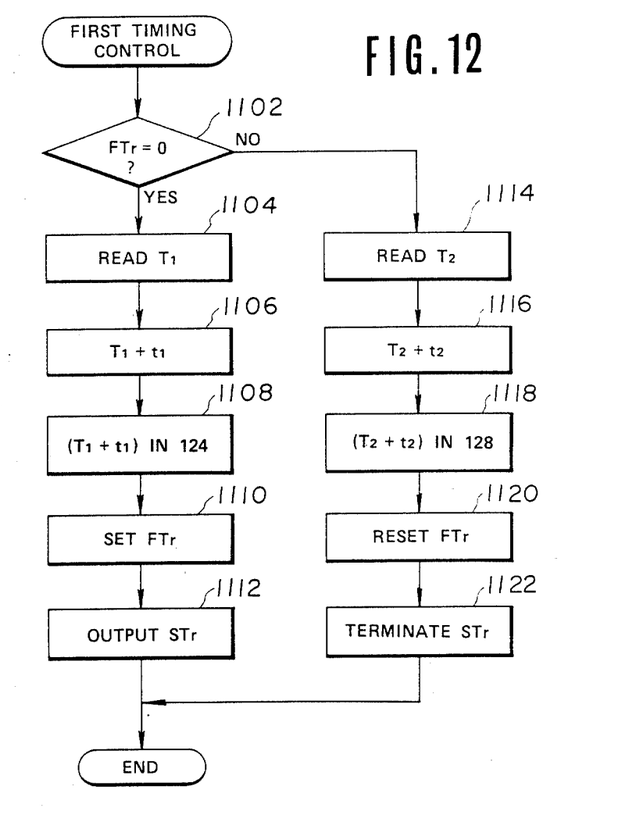
FIG. 12 is a flowchart of the first control program to be executed by the microprocessor of the distance sensor of FIG. 10.
Figure 13:
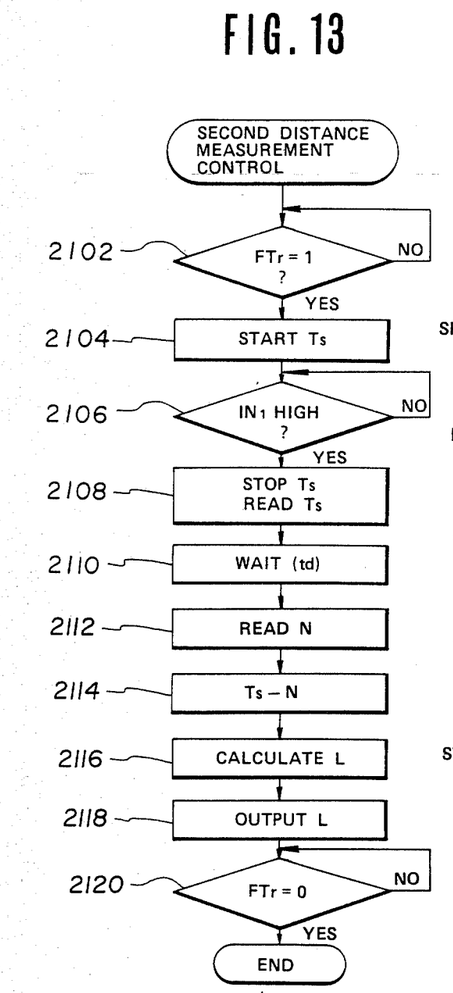
FIG. 13 is a flowchart of the second control program to be executed by the microprocessor of the distance sensor of FIG. 10.

FIGS. 12 and 13 are flowcharts of the first and second control programs for deriving the distance, which programs are to be executed by the microprocessor of FIG. 10. As in the foregoing first embodiment, the first and second control programs are executed in response to timer and trigger signals.

The first control program is at first triggered by the trigger signal STr output through the output terminal OUT₁ of the microprocessor 100. At the initial stage of execution, a trigger-signal-output indicative flag FTr in a flag register 120 in the microprocessor is checked at a step 1102. The trigger-signal-output indicative flag FTr will be referred to hereafter as "FLAG FTr". The FLAG TRr is set while the trigger signal STr is being output through the output terminal OUT₁ of the microprocessor to the transmitter 20 and is reset when the trigger signal is not being output.

If the FLAG FTr is set when checked at step 1102, then the value $T_1$ of the timer 122 in the microcomputer is latched at a step 1104. The timer 122 counts clock pulses from the clock generator 114. A trigger-signal-ON-time value $t_1$ is added to the latched timer value $T_1$ at a step 1106. The resultant value $(T_1+t_1)$, which represents the trigger signal switch-off timing, is transferred to and stored in a $T_1$-register 124 in the microprocessor, at a step 1108. Then the FLAG FTr is set at a step 1110. A HIGH level output is applied to the output terminal OUT₁ as the trigger signal STr at a step 1112.

During the period $t_1$ starting from the time $T_1$, the potential at the output terminal OUT₁ is held HIGH to continue application of the trigger signal STr to the transmitter 20. The timer 122 continues counting clock pulses and after the period $t_1$, produces a timer signal which serves as trigger signal for the next cycle of the first control program.

In response to the timer signal at the end of period $t_1$, the first control program is executed again. Since the FLAG FTr was set at the step 1110 in the previous cycle of program execution, the answer at the step 1102 becomes NO. Thus, control passes to a step 1114 in which the timer value $T_2$ of the timer 126 in the microprocessor 100 is latched at a step 1116. Similarly to the aforementioned timer 122, the timer 126 continuously counts clock pulses from the clock generator 114. An interval-indicative time value $t_2$ is added at to the latched timer value $T_2$ a step 1118. The time value $t_2$ corresponds to predetermined interval between trigger signals. The resultant time value $(T_2+t_2)$ is stored in a $T_2$-register 128 in the microprocessor 100. Then, the FLAG FTr is reset at a step 1120. After the step 1120, the output level at the output terminal OUT₁ of the microprocessor drops to LOW, at a step 1122. Thus, the trigger signal STr ends.

As will be appreciated from the above, the trigger signal STr is produced at regular intervals $t_2$. The duration of each trigger signal STr is defined by the time value $t_1$.

FIG. 13 shows a second distance measurement control program which includes steps for correction of the timer value. This second program is to be executed at predetermined intervals determined relative to the trigger signal output timing determined by the first control program. At the initial stage of program execution in the second program, the FLAG FTr is checked at a step 2102 to see if the FLAG FTr is set. If reset, the step 2102 loops until the FLAG FTr is set. After the FLAG FTr is set, the clock counter 116 is activated to start measurement of the interval between transmission of the ultra-sonic wave and receipt of the reflected ultra-sonic waves, at a step 2004. Thereafter, at a step 2106, input level at the input terminal IN₁ is monitored until a HIGH-level signal at the input terminal IN₁ is detected. As soon as a HIGH-level input is detected at the step 2106, the counter value $T_S$ of the clock counter 116 is latched and the clock counter 116 is deactivated at a step 2108. At a step 2110, the microprocessor is held in a "WAIT" state for a predetermined delay period $t_d$. This delay period $t_d$ allows the steepness analyser 150 to finish working before the subsequent step 2112. Therefore, the delay time $t_d$ is set to be the longest possible period necessary for the steepness analyser 150 to finish.

After the given delay time expires, the counter value N is read out through the input terminal N₂ at a step 2112. On the basis of the read counter value N, $(T_s-N)$ is calculated and the resultant value is stored as time value T at a step 2114. After this, arithmetic operations are performed at a step 2116 to derive the distance data L on the basis of the time value $T (=T_s-N)$. The microprocessor 100 then output the distance-indicative signal representative of the derived distance value L at a step 2118. Thereafter, the FLAG FTr is reset at a step 2120, whereupon the current execution cycle ends.

The second control program may be modified to derive a correction value for correcting for deviations due to non-linear characteristics of the receiver signal.

If the receiver signal rises non-linearly, the rate of change of the signal level may be expressed by the following equation:

$$V=f(t-T) \tag{7}$$

Assuming $(t-T)=T'\alpha$ the last equation can be modified to read $$V=f(T')$$

where f is dependent upon the rising characteristics of the receiver signal, as shown in FIG. 14. From the equation (7), T' can be expressed as $$T'=f^{-1}(V) \tag{8}$$

If the output level of the receiver signal is $V_1$, $V_2$ and $V_{TH}$ ... at times $T_1'$, $T_2'$ and $T_s'$ ... respectively, then the following expressions hold:

$$T_1'=f^{-1}(V_1), T_1'=T_1-T$$

$$T_2'=f^{-1}(V_2), T_2'=T_2-T$$

$$T_s'=f^{-1}(V_{TH}), T_s'=T_s-T$$

It should be appreciated that, although the threshold value $V_{TH}$ shown in FIG. 14 is smaller than $V_1$, the threshold level can be chosen arbitrarily. It is only necessary to select the receiver signal levels $V_1$, $V_2$ and $V_{TH}$ to be within asignal level range wherein the signal level variation rate is essentially constant and does not vary significantly.

The time value $T_s'$ at the receiver signal level equaling the threshold level $V_{TH}$ can be approximated as $T_2'-T_1'$. The relationship between $T_s'$ and $T_2'-T_1'$ can be obtained experimentarily. Therefore, by providing a look-up table of $T'_s$ values in terms of $(T_2'-T_1')$, $T_s'$ can be derived on the basis of the time values $T_2'$ and $T_1'$. According to this procedure, the counter value N is modified to N' which includes systematic error due to non-linear variation of the receiver signal level and represents an approximate time value $T_s'$ at which the receiver signal level reaches the threshold level $V_{TH}$.

Figure 16:
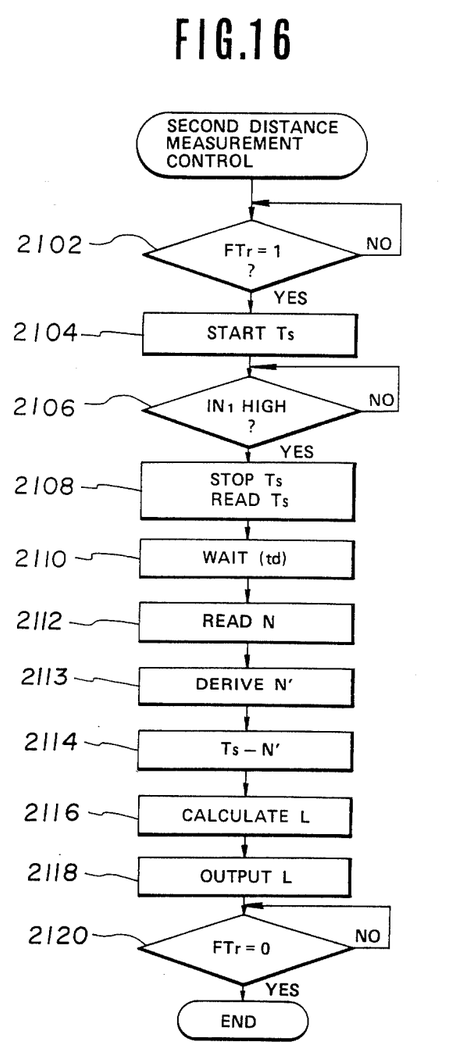
FIG. 16 is a flowchart similar to FIG. 13 but showing a modification thereof incorporating correction for elapsed time.

In order to perform the aforementioned correction procedure for a receiver signal with non-linear rising characteristics, the second control program is modified at the steps 2112, 2114 as shown in FIG. 16. In practice, a step 2113 for deriving the modified counter value N' is added between the steps 2112 and 2114. In the step 2113, a table look-up is carried out to derive the modified value N' according to the procedure described above.

As will be appreciated herefrom, the distance measurement according to the present invention can be performed more precisely by correcting for deviations due to variations of the receiver signal level and in the steepness of the rising edge of the receiver signal. Therefore, the invention fulfills all of the object and advantages sought therefor.

What is claimed is:

1. An ultra-sonic distance sensor comprising:
   an ultra-sonic wave transmitter for transmitting ultra-sonic waves of a given frequency toward an object at regular intervals;
   an ultra-sonic receiver for receiving ultrasonic waves reflected by the object and producing a receiver signal having a value indicative of the amplitude of the received ultra-sonic waves;
   first means for measuring the elapsed time between transmitting of the ultra-sonic waves by said transmitter and reception of ultra-sonic waves having an amplitude greater than a predetermined level, said first means producing an elapsed-time-indicative signal having a value representative of the measured elapsed time;
   second means for detecting the rising characteristics of the receiver signal and deriving a correction value for said elapsed-time-indicative signal value on the basis of the detected rising characteristics of the receiver signal; and
   third means for modifying said elapsed-time-indicative signal value in accordance with said correction value, deriving a distance value indicative of the distance to said object based on the modified-elapsed-time indicative signal value, and producing a distance-value-indicative signal representative of the derived distance value.

2. The distance sensor as set forth in claim 1, wherein said second means latches the peak value of said receiver signal and derives the correction value on the basis of the latched peak value.

3. The distance sensor as set forth in claim 2, wherein said second means comprises a peak-hold circuit associated with said receiver to receive said receiver signal and latch the peak value thereof, and a correction value generator which outputs a correction-value indicative signal which is derived on the basis of the latched peak value.

4. The distance sensor as set forth in claim 3, wherein said correction value is derived from a correction table which holds correction values in a one-to-one correspondence with the peak values of the receiver signal.

5. The distance sensor as set forth in claim 1, wherein said second means derives said correction value on the basis of the rate of change of the receiver signal while signal level is rising.

6. The distance sensor as set forth in claim 5, wherein said second means measures the period of time required for the receiver signal level to rise from a first given level to a second given level.

7. The distance sensor as set forth in claim 6, wherein said second means includes a correction table which holds a predetermined correction value for each value of said period of time.

8. A method for measuring the distance to an object by means of ultra-sonic waves comprising the steps of:
   triggering an ultra-sonic wave transmitter to transmit ultra-sonic waves at a given frequency towards said object;
   starting a timer concurrently with triggering of the ultra-sonic wave transmitter;
   receiving ultra-sonic waves reflected by said object and producing a receiver signal having a signal level proportional to the amplitude of the received ultra-sonic waves;
   terminating measurement of elapsed time by said timer and producing a timer signal indicative of the measured elapsed time concurrently with production of said receiver signal;
   detecting signal level variation characteristics of said receiver signal and deriving a correction value for said timer signal value on the basis of detected variation characteristics;
   modifying said timer signal value in accordance with said correction value; and
   performing arithmetic operations on the basis of said modified timer signal value to derive a distance value indicative of the distance to said object and producing a signal indicative of said distance value.

9. The method as set forth in claim 8, in which said correction value is derived on the basis of the peak value of said receiver signal.

10. The method as set forth in claim 8, in which said correction value is derived on the basis of the period of time required for said receiver signal level to vary from a first given level to a second higher given level.

* * * * *